No. 788,600. PATENTED MAY 2, 1905.
T. C. ROGERS.
HOSE COUPLING.
APPLICATION FILED NOV. 1, 1904.
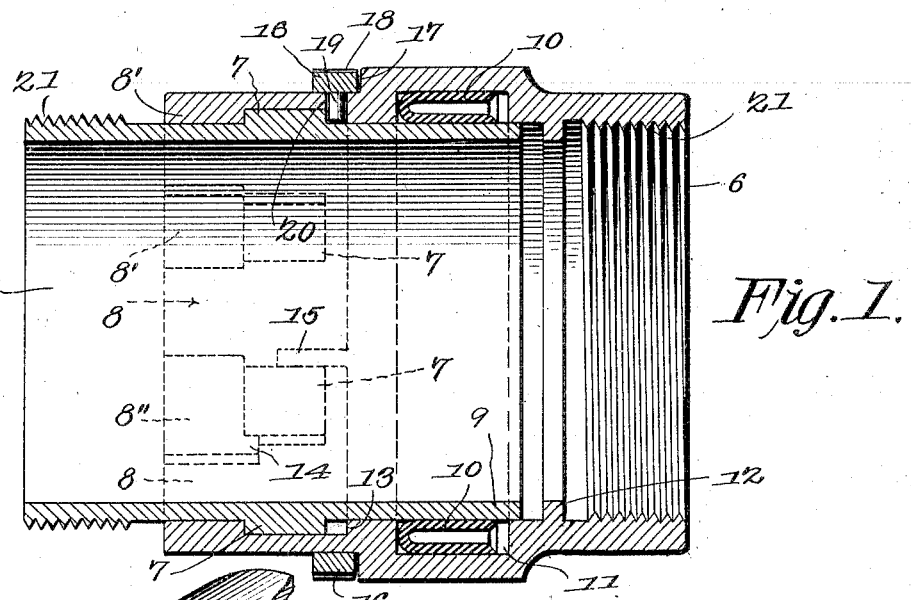
Fig. 1.
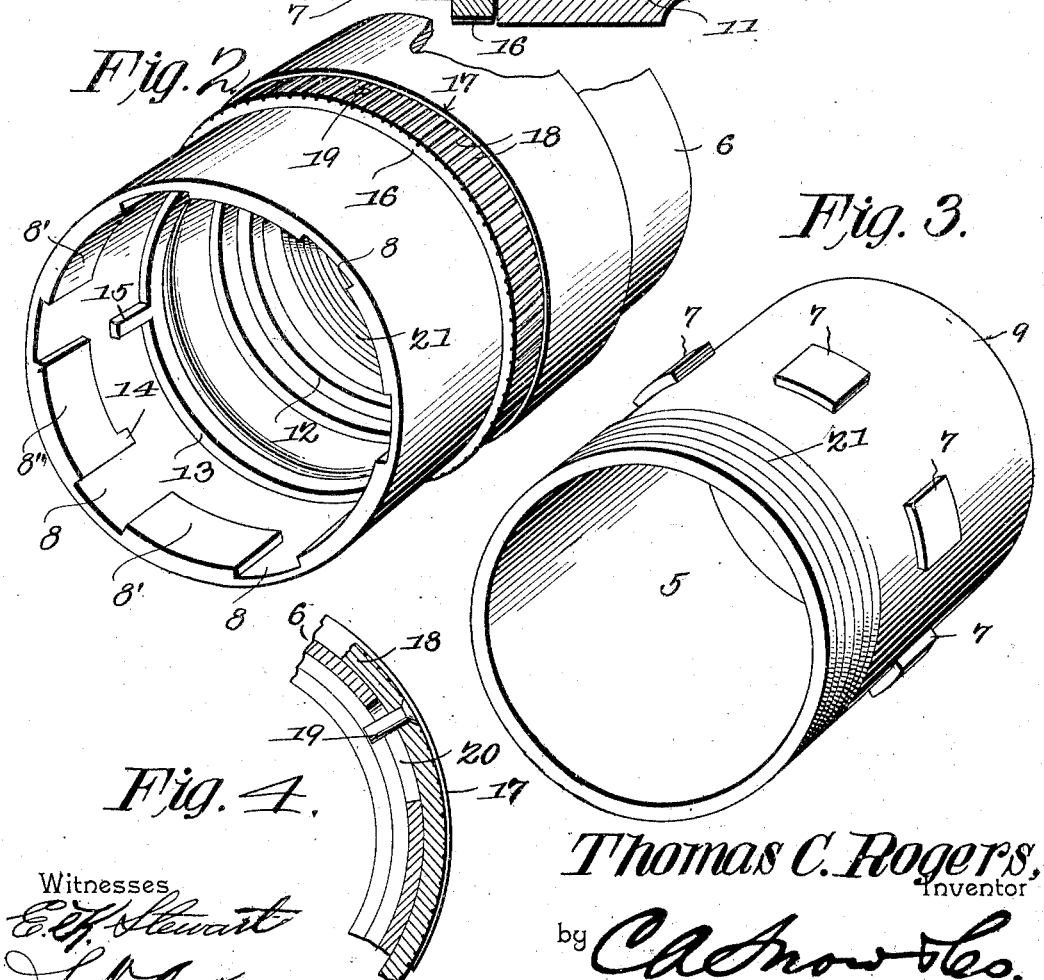
Fig. 2.
Fig. 3.
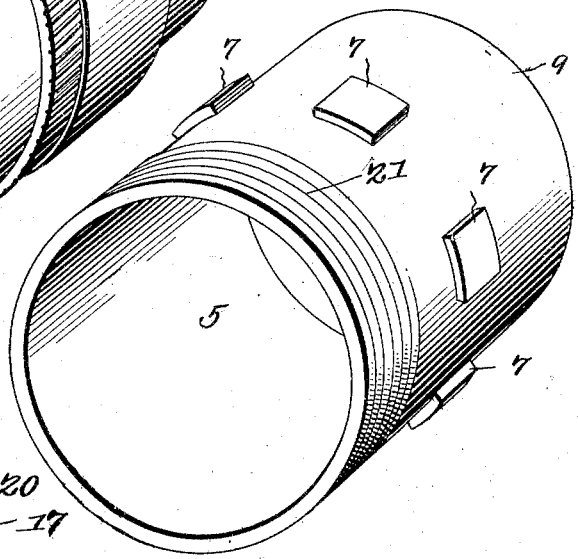
Fig. 4.
Witnesses
Thomas C. Rogers, Inventor
by C. A. Snow & Co.
Attorneys No. 788,600. Patented May 2, 1905.

UNITED STATES PATENT OFFICE.

THOMAS C. ROGERS, OF SISTERSVILLE, WEST VIRGINIA.

HOSE-COUPLING.

SPECIFICATION forming part of Letters Patent No. 788,600, dated May 2, 1905.

Application filed November 1, 1904. Serial No. 230,972.

*To all whom it may concern:*

Be it known that I, THOMAS C. ROGERS, a citizen of the United States, residing at Sistersville, in the county of Tyler and State of West Virginia, have invented a new and useful Hose-Coupling, of which the following is a specification.

This invention relates to an improved hose or pipe coupling, and has for its object to provide a simple, inexpensive, and efficient device of this character, by means of which two or more sections of pipe or hose may be quickly and conveniently coupled and securely locked in coupled position.

A further object of the invention is to provide a coupling in which the use of threads and similar fastening devices is entirely dispensed with, the adjacent sections of pipe or hose being provided with locking-lugs adapted to engage each other when the pipe-sections are assembled.

A further object is to provide an auxiliary locking device adapted to engage the lugs on the male member, so as to prevent independent longitudinal and rotative movement of the hose-sections.

A still further object is to provide a novel form of gasket or packing-ring which contacts with the end of the male member and insures a water-tight joint between the members comprising the coupling.

The invention consists in the construction and novel combination and arrangement of parts hereinafter fully described, illustrated in the accompanying drawings, and pointed out in the claims hereto appended, it being understood that various changes in form, proportion, and minor details of construction may be resorted to without departing from the principle or sacrificing any of the advantages of this invention.

In the accompanying drawings, forming a part of this specification, Figure 1 is a longitudinal sectional view showing the adjacent sections of hose or pipe locked in coupled position. Fig. 2 is a perspective view of the female member detached. Fig. 3 is a similar view of the male member detached, and Fig. 4 is a transverse sectional view of a portion of the female member and locking-ring.

Similar numerals of reference indicate corresponding parts in all the figures of the drawings.

The device consists of a male member 5 and a female member 6, the male member being preferably cylindrical in form, as shown, and provided with a series of spaced peripheral locking-lugs 7, adapted to enter recesses 8, formed by a plurality of spaced lugs 8', secured to or formed integral with the interior of the female member. The lugs 7 are spaced inwardly from one end of the male member, thereby defining an annular flange or extension 9, which engages a gasket or packing-ring 10, seated in an annular recess 11 in the female member when the two sections of pipe or hose are coupled. This gasket is preferably U-shaped in cross-section and may be formed of rubber, leather, or other suitable material having sufficient flexibility to permit the gasket to be doubled and of the requisite strength and resiliency to serve the purpose of a packing. The female member 6 is provided with an inwardly-extending annular rib or flange 12 and an interior annular shoulder 13, the latter being spaced a sufficient distance from the lugs 8' to permit the locking-lugs of the male member to be moved longitudinally into engagement therewith, as will be more fully explained hereinafter.

One edge of the lug 8'' of the female member is provided with an integral laterally-extending projection or lip 14, and preferably cast integral with the shoulder 13 is a stop-pin 15, the end of which is arranged in advance of said lip and disposed in alinement with the opposite edge of the lug 8'', said stop-pin being adapted to engage one of the lugs 7 of the male member and lock the adjacent pipe-sections against independent rotative movement. Attention is called to the fact that the distance between the end of the lip 14 and the shoulder 13 is slightly greater than the length of the locking-lugs 7, so as to permit said lugs to clear the lip when the male member is given a partial rotation.

Mounted on the female member 6 is a locking-ring 16, one side of which bears against an annular shoulder 17, while the periphery thereof is milled or otherwise roughened, as indicated at 18, to facilitate the turning of the same. The ring 16 is provided with an inwardly-extending pin 19, which passes through a segmental slot 20 in the walls of the female member 6 and bears against the annular shoulder 13, so that when said ring is given a partial rotation the pin 19 will engage the rear edge of one of the lugs 7 and prevent longitudinal movement of the pipe-sections.

In coupling the pipe-sections the male member is introduced into the female member and the former moved longitudinally within the latter until the lugs 7 engage the shoulder 13, in which position said lugs will clear the projection or lip 14. The male member is then rotated until the adjacent lug 7 engages the stop-pin 15, after which an outward pull is exerted on the male member, which causes the said lug to engage the projection 14, as clearly shown in dotted lines in Fig. 1 of the drawings. The locking-ring 16 is then given a partial rotation, causing the pin 19 to bear against the adjacent lug 7 and all of said lugs to be forced into engagement with the lugs 8' of the female member. It will thus be seen that the pipe-sections are effectually prevented from rotating one within the other, while longitudinal movement of said sections is also prevented by means of the locking-pin 19. To uncouple the sections, it is merely necessary to rotate the ring 16 in the opposite direction, when the sections may be readily uncoupled by reversing the operation above described.

It will be understood that as many of the lugs 8' may be provided with the locking-lip 14 as may be found necessary to securely lock the two sections of pipe, and in the event of more than one lip being employed corresponding stop-pins will be formed on the shoulder 13.

In the present illustration of the invention I have shown threads 21 for attaching the hose to the coupling members 5 and 6; but this may be effected in any desired or approved manner and forms no part of the present invention.

Having thus described the invention, what is claimed is—

1. A hose-coupling comprising a female member provided with a plurality of spaced lugs, one of which is extended to form a locking-lip, and a male member provided with corresponding spaced lugs for engagement with the lugs on the female member, one of the lugs of the male member being adapted to engage the locking-lip of the adjacent lug on the female member, and a locking-ring rotatably mounted on the female member and provided with an inwardly-extending pin adapted to engage one of the lugs on the male member.

2. A hose-coupling comprising a female member provided with a plurality of spaced lugs one of which is provided with a locking-lip, a stop-pin secured to the female member and disposed in advance and spaced from said lip, a male member provided with a plurality of mating lugs one of which is adapted to engage said lip and stop-pin, respectively, and a ring rotatably mounted on the female member and provided with an inwardly-extending pin adapted to engage one of the lugs on the male member.

3. A hose-coupling comprising a female member provided with an interior annular shoulder and having a slot formed in the walls thereof adjacent to said shoulder, a plurality of spaced lugs carried by the female member one of which is provided with a locking-lip, a stop-pin secured to the annular shoulder and disposed in advance of and spaced from said locking-lip, a male member provided with mating lugs one of which is adapted to engage the stop-pin and locking-lip, respectively, and a ring rotatably mounted on the female member and provided with an inwardly-extending pin adapted to pass through the slot in said member and engage one of the lugs on the male member.

4. A hose-coupling comprising male and female members provided with interengaging lugs, one of said members being formed with a segmental slot and provided with an interior flange adapted to engage the lugs on the adjacent member for limiting the longitudinal movement of the latter, and a locking-ring rotatably mounted on the slotted member and provided with a depending pin extending through said slot for engagement with the lugs on the opposite member for locking said members in coupled position.

5. A hose-coupling comprising a female member provided with an annular enlargement having a seating-recess formed thereon, a plurality of spaced lugs carried by the female member one of which is formed with a terminal locking-lip, a stop-pin secured to said member and disposed in advance of the locking-lip, a gasket seated in the recess in said female member, a male member provided with an integral extension projecting across the seating-recess in the female member, and engaging the gasket, said male member being provided with mating lugs one of which is adapted to engage the locking-lip and stop-pin, respectively, and a ring rotatably mounted on the female member and provided with a depending pin adapted to engage one of the lugs on the male member for locking said members in coupled position.

In testimony that I claim the foregoing as my own I have hereto affixed my signature in the presence of two witnesses.

THOMAS C. ROGERS.

Witnesses:
C. C. CRIBBS,
W. M. BROWN.